United States Patent
Fan et al.

(10) Patent No.: US 10,069,880 B2
(45) Date of Patent: Sep. 4, 2018

(54) METHOD AND CLIENT TERMINAL DEVICE FOR SHARING DATA IN A BROWSER

(71) Applicant: TENCENT TECHNOLOGY (SHENZHEN) COMPANY LIMITED, Shenzhen (CN)

(72) Inventors: Yuewei Fan, Shenzhen (CN); Yisha Lu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 175 days.

(21) Appl. No.: 14/749,278

(22) Filed: Jun. 24, 2015

(65) Prior Publication Data

US 2015/0295961 A1    Oct. 15, 2015

Related U.S. Application Data

(63) Continuation of application No. PCT/CN2013/088013, filed on Nov. 28, 2013.

(30) Foreign Application Priority Data

Dec. 24, 2012    (CN) .......................... 2012 1 0566240

(51) Int. Cl.
  *H04L 29/06* (2006.01)
  *G06F 17/30* (2006.01)
(52) U.S. Cl.
  CPC ...... *H04L 65/403* (2013.01); *G06F 17/30873* (2013.01); *G06F 17/30887* (2013.01)
(58) Field of Classification Search
  CPC ......... G06F 17/30873; G06F 17/30887; H04L 65/403

USPC .......................................................... 709/204
See application file for complete search history.

(56) References Cited

U.S. PATENT DOCUMENTS

| | | | | |
|---|---|---|---|---|
| 2003/0208376 | A1* | 11/2003 | Vennum | G06F 19/324 705/2 |
| 2005/0004844 | A1* | 1/2005 | Attia | G06Q 30/0603 705/26.8 |
| 2005/0038716 | A1* | 2/2005 | Eagle | G06Q 10/00 705/26.1 |

(Continued)

FOREIGN PATENT DOCUMENTS

| | | |
|---|---|---|
| CN | 1635813 A | 7/2005 |
| CN | 1867142 A | 11/2006 |

(Continued)

OTHER PUBLICATIONS

CN Office Action dated Mar. 3, 2014 re: Application No. 201210566240.9; pp. 1-13.

(Continued)

*Primary Examiner* — Alina A Boutah
(74) *Attorney, Agent, or Firm* — Cantor Colburn LLP

(57) ABSTRACT

Data sharing methods and client terminal devices may be provided by examples of the present disclosure. A data sharing instruction may be received by a first client terminal device. First data in a browser of the first client terminal device may be obtained by the first client terminal device. Graphic coding may be performed by the first client terminal device on the first data to generate second data. The second data may be published by the first client terminal device.

8 Claims, 5 Drawing Sheets

(56) References Cited

U.S. PATENT DOCUMENTS

| | | | |
|---|---|---|---|
| 2006/0112340 A1* | 5/2006 | Mohr | G06F 17/30873 715/733 |
| 2008/0052140 A1* | 2/2008 | Neal | G06Q 30/02 705/1.1 |
| 2008/0189185 A1* | 8/2008 | Matsuo | G06Q 20/202 705/21 |
| 2009/0059264 A1* | 3/2009 | Tsuji | H04N 1/00355 358/1.13 |
| 2010/0070899 A1* | 3/2010 | Hunt | G06F 17/30861 715/769 |
| 2011/0218907 A1* | 9/2011 | Dessert | G06Q 20/10 705/39 |
| 2012/0010995 A1* | 1/2012 | Skirpa | G06F 3/0481 705/14.49 |
| 2012/0215846 A1* | 8/2012 | Howes | G06Q 10/10 709/204 |
| 2012/0304089 A1* | 11/2012 | Cohen | G06F 11/0766 715/764 |
| 2013/0054714 A1* | 2/2013 | Bedi | G06Q 10/10 709/206 |
| 2013/0144674 A1* | 6/2013 | Kim | G06Q 30/0207 705/7.19 |
| 2013/0205277 A1* | 8/2013 | Seven | G06F 8/38 717/121 |
| 2015/0304369 A1* | 10/2015 | Sandholm | G06Q 10/10 715/753 |

FOREIGN PATENT DOCUMENTS

| | | |
|---|---|---|
| CN | 101976329 A | 2/2011 |
| CN | 102394926 A | 3/2012 |
| CN | 102811261 A | 12/2012 |
| CN | 102833353 A | 12/2012 |
| CN | 103024063 A | 4/2013 |

OTHER PUBLICATIONS

CN Office Action dated Jul. 30, 2013 re: Application No. 201210566240.9; pp. 1-8.

International Prelimimary Report on Patentability dated Jul. 9, 2015 and Written Opinion dated Feb. 27, 2014 re: Application No. PCT/CN2013/088013; pp. 1-8.

International Search Report dated Feb. 27, 2014 re: Application No. PCT/CN2013/088013; citing: CN 103024063 A, CN 102833353 A, CN 102394926 A and CN 102811261 A.

* cited by examiner

METHOD AND CLIENT TERMINAL DEVICE FOR SHARING DATA IN A BROWSER

CROSS REFERENCE TO RELATED APPLICATIONS

This application is a continuation of International Application No. PCT/CN2013/088013, filed on Nov. 28, 2013, which claims priority to Chinese patent application No. 201210566240.9, filed on Dec. 24, 2012, the content of both of which applications are incorporated herein by reference in their entirety.

FIELD OF THE INVENTION

The present application relates a field of Internet technologies, and more particularly, to data sharing methods and client terminal devices.

BACKGROUND

With the development of the Internet, the development trend of the Internet is sharing data among client terminal devices with the Internet. In the prior art, the scheme for sharing the data among the client terminal devices is sharing the data via wired connection. For instance, a mobile phone may be connected with a Personal Computer (PC) via a data cable. Data may be transmitted between the mobile phone and the PC. With this scheme, the client terminal devices should be connected with cables first, and then the data may be shared among the client terminal devices. So, this technical scheme may be complicated. Furthermore, with this scheme, the client terminal devices should be connected with wired cables. If the client terminal devices connect with each other with a wireless mode, the data cannot be shared among them. Furthermore, if wired interfaces among the client terminal devices do not match, the wired connection cannot be established among them and data sharing among the client terminal devices cannot be implemented.

SUMMARY

Examples of the present disclosure may provide data sharing methods and client terminal devices, by which data may be shared between client terminal devices without the limitation of a connection mode, an operation of data sharing may be simplified and efficiency of data sharing may be enhanced.

An example of the present disclosure may provide a data sharing method. The method includes:
  receiving, by a first client terminal device, a data sharing instruction;
  obtaining, by the first client terminal device, first data in a browser of the first client terminal device;
  performing, by the first client terminal device, graphic coding on the first data to generate second data;
  publishing, by the first client terminal device, the second data.

Another example of the present disclosure may provide another data sharing method. The method may include:
  obtaining, by a second client terminal device, second data published by a first client terminal device;
  obtaining, by the second client terminal device, first data in a browser of the first client terminal device by performing graphic decoding on the second data; and
  outputting, by the second client terminal device, the first data.

Another example of the present disclosure may provide a client terminal device. The client terminal device may include:
  an obtaining module, to receive a data sharing instruction and obtain first data in a browser of the client terminal device;
  a coding module, to perform graphic coding on the first data to generate second data; and
  a sharing module, to publish the second data.

Another example of the present disclosure may provide another client terminal device. The client terminal device may include:
  an obtaining module, to obtain second data published by a first client terminal device;
  a decoding module, to obtain first data in a browser of the first client terminal device by performing graphic decoding on the second data; and
  an outputting module, to output the first data.

Another example of the present disclosure may provide a non-transitory computer-readable medium storing a program, executed by a computer to execute the above method.

In examples of the present disclosure, the first client terminal device may perform the graphic coding on the to-be-shared first data in the browser of the first client terminal device to generate the second data and publish the second data. The second client terminal device may perform graphic decoding on the second data published by the first client terminal device. Therefore, the first data may be shared by the first client terminal device and the second client terminal device. With the examples of the present disclosure, the first client terminal device and the second client terminal device need not to be connected by wires or connected wirelessly. Therefore, the operation of the data sharing may not be limited by the connection mode, the operation of the data sharing may be simple and the efficiency of the data sharing may be enhanced.

BRIEF DESCRIPTION OF THE DRAWINGS

In order to clearly describe the technical scheme in the present disclosure, a brief description is given to accompanying figures used in following examples. Obviously, the accompanying figures described hereinafter are some examples in the present disclosure. An ordinary skilled in the art may obtain other figures with these accompanying figures without creative work.

DETAILED DESCRIPTION

For simplicity and illustrative purposes, the present disclosure is described by referring mainly to example(s) thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

According to an example of the present disclosure, a first client terminal device may be any client terminal device in a data sharing system. The first client terminal device may be any of a PC, a tablet PC, a mobile phone, a smartphone, an electronic reader, a laptop, etc. In the alternative, the first client terminal device may be a client terminal device module in a terminal device, such as, a browser client terminal device. A second client terminal device(s) may be one or more client terminal devices except for the first client terminal device in the data sharing system. The second client terminal device may be at least one of the PC, tablet PC, mobile phone, smartphone, electronic reader, laptop, etc. In the alternative, the second client terminal device may be a client terminal device module in a terminal device, such as, a browser client terminal device. First data shared by the first client terminal device and the second client terminal device may include but not be limited to at least one of a Uniform Resource Locator (URL), text data, picture data, audio data and video data.

The data sharing method provided by an example of the present disclosure may be described hereinafter in detail accompanying with FIGS. 1 to 4*d*.

Figure 1:
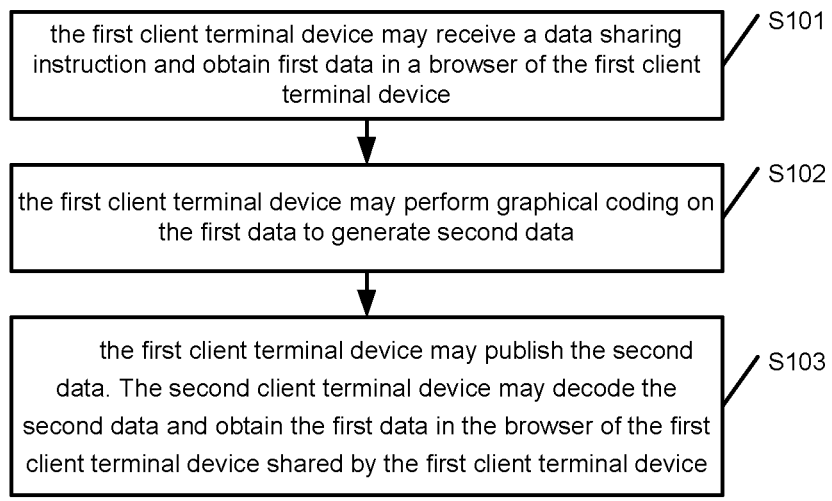
FIG. 1 is a flow chart illustrating a data sharing method in accordance with an example of the present disclosure.

Referring to FIG. 1, FIG. 1 is a flow chart illustrating a data sharing method in accordance with an example of the present disclosure. The flow of the data sharing method executed by the first client terminal device may be described in this example. This method may include blocks S101 to S103.

In block S101, the first client terminal device may receive a data sharing instruction and obtain first data in a browser of the first client terminal device.

When a user of the first client terminal device shares the first data in the browser of the first client terminal device with another client terminal device, the user may send the data sharing instruction to the first client terminal device and the first client terminal device may obtain the first data instructed by the data sharing instruction. For instance, if a user of a PC intends to share a Uniform Resource Locator (URL) of a current page in a browser of the PC with a mobile phone to utilize mobility and convenience of the mobile phone and view the current page on the PC anytime and anywhere, the user of the PC may send the data sharing instruction to the PC to instruct the PC to share the URL of the current page and the PC may obtain the URL of the current page from the browser.

In block S102, the first client terminal device may perform graphical coding on the first data to generate second data.

In block S103, the first client terminal device may publish the second data.

In this block, the first client terminal device may publish the second data, so that the second client terminal device may decode the second data and obtain the first data in the browser of the first client terminal device shared by the first client terminal device.

In blocks S102 to S103, the first client terminal device may perform the graphic coding on the first data to generate the second data and share the first data via publishing the second data. It may be avoided that the to-be-shared first data may be directly published and the security of the to-be-shared first data and the reliability of the data sharing may be ensured.

In this example of the present disclosure, the first client terminal device may perform the graphic coding on the to-be-shared first data in the browser of the first client terminal device to generate the second data and publish the second data. The second client terminal device may perform graphic decoding on the second data published by the first client terminal device. Therefore, the first data may be shared by the first client terminal device and the second client terminal device. With the examples of the present disclosure, the first client terminal device and the second client terminal device need not to be connected by wires or connected wirelessly. Therefore, operations of the data sharing may not be limited by the connection mode, the operations of the data sharing may be simple and the efficiency of the data sharing may be enhanced.

Figure 2:
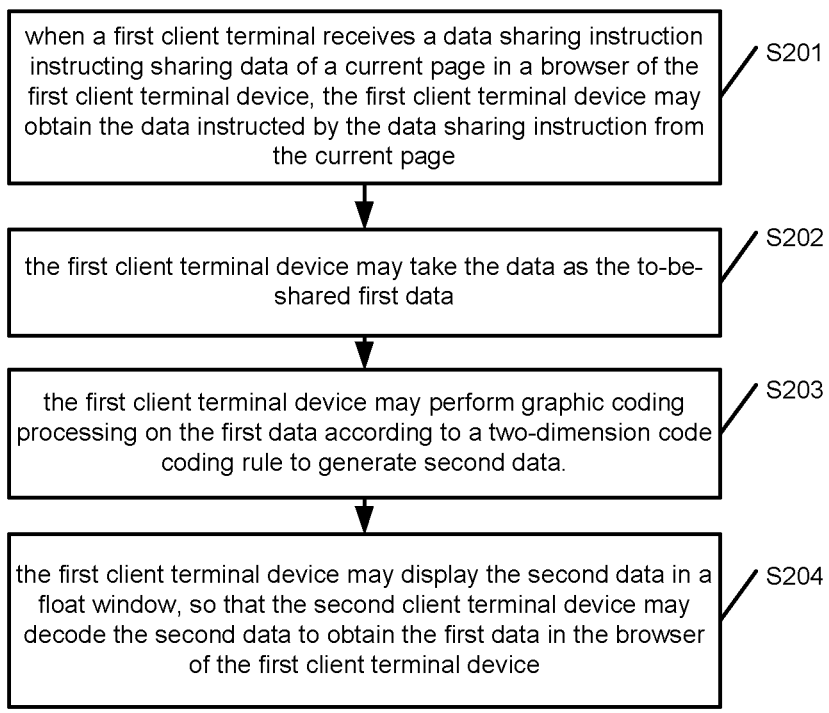
FIG. 2 is a flow chart illustrating another data sharing method in accordance with an example of the present disclosure.

Referring to FIG. 2, FIG. 2 is a flow chart illustrating another data sharing method in accordance with an example of the present disclosure. The flow of the data sharing method executed by the first client terminal device may be described in this example. This method may include blocks S201 to S204.

In block S201, when a first client terminal receives a data sharing instruction instructing sharing data of a current page in a browser of the first client terminal device, the first client terminal device may obtain the data instructed by the data sharing instruction from the current page.

When a user of the first client terminal device intends to share the first data in the browser of the first client terminal device with another client terminal device, the user may send the data sharing instruction to the first client terminal device. The first client terminal device may obtain the to-be-shared first data instructed by the data sharing instruction. For instance, a user of a mobile phone intends to share a picture in the current page of the browser of the mobile phone with a PC to utilize the big screen of the PC and conveniently view the picture in the current page in the mobile phone. In this block, the user of the mobile phone may send the data sharing instruction to the mobile phone to instruct the mobile phone to share the URL of the current page and the mobile phone may obtain the picture in the current page from the browser.

In block S202, the first client terminal device may take the data as the to-be-shared first data.

In block S203, the first client terminal device may perform graphic coding processing on the first data according to a two-dimension code coding rule to generate second data. The second data may be a two-dimension code image.

The two-dimension code may be a Multi-row two-dimension code, also called a stacked two-dimension code or a Multi-layer two-dimension code. The Multi-row two-dimension code may include but not be limited to a Portable Data File (PDF) 417 code, a CODE49 code or a CODE 16K code. The two-dimension code may also be a matrix two-dimension code, also called a checker-board two-dimension code. The matrix two-dimension code may include but not be limited to a Quick Response (QR) code, a Maxi code or a Data Matrix code. Each type of two-dimension code may have a corresponding coding rule. In this block, the first client terminal device may code the first data with the two-dimension code coding rule to generate the second data. The second data may be the two-dimension code image. For instance, the mobile phone may code the picture (i.e. the first data) in the current page with the two-dimension code coding rule to generate the two-dimension code image (i.e. the second data).

In block S204, the first client terminal device may display the second data in a float window, so that the second client terminal device may decode the second data to obtain the first data in the browser of the first client terminal device.

The second data may be displayed by the first client terminal device with the independent float window, so that the two-dimension code image of the second data may be intuitively displayed and the second client terminal device may conveniently scan and decode the two-dimension code image. In this example, the second client terminal device may include a two-dimension code tool. The two-dimension code tool may be an independent function module in the second client terminal device. For instance, the two-dimension code tool may be a two-dimension code application stalled on the second client terminal device. The two-dimension code application may be used for scanning and decoding the two-dimension code image. The two-dimension code tool may be a function module in an application of the second client terminal device. For instance, the two-dimension code tool may be a two-dimension code function module in the browser of the second client device. After the browser of the second client terminal device is opened, the two-dimension code function module in the browser may be used to scan and decode the two-dimension code image.

According to this example of the present disclosure, the first client terminal device may perform the graphic coding on the to-be-shared first data in the browser of the first client terminal device to generate the second data and publish the second data. The second client terminal device may perform graphic decoding on the second data published by the first client terminal device. That is, the first data may be shared between the first client terminal device and the second client terminal device. With the examples of the present disclosure, the first client terminal device and the second client terminal device need not to be connected by wires or connected wirelessly. Therefore, operations of the data sharing may not be limited by the connection mode, the operations of the data sharing may be simple and the efficiency of the data sharing may be enhanced.

Figure 3:
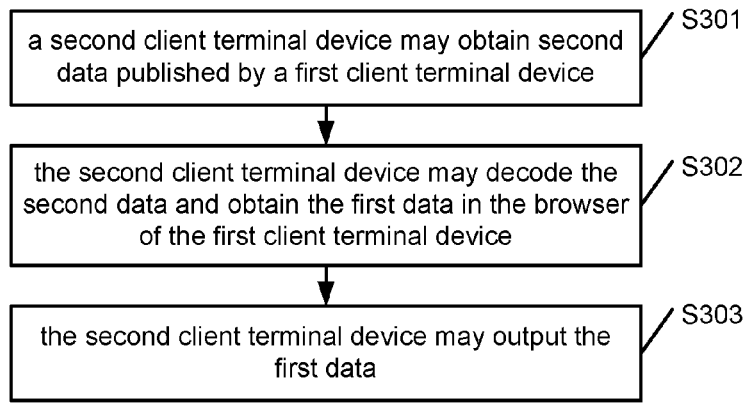
FIG. 3 is a flow chart illustrating another data sharing method in accordance with an example of the present disclosure.

Referring to FIG. 3, FIG. 3 is a flow chart illustrating another data sharing method in accordance with an example of the present disclosure. The flow of the data sharing method executed by a second client terminal device may be described in this example. This method may include blocks S301 to S303.

In block S301, a second client terminal device may obtain second data published by a first client terminal device.

The first client terminal device may display the second data with an independent float window to publish the second data. In this block, the second client terminal device may obtain the second data published by the first client terminal device via reading content in the float window displayed on the first client terminal device. The second data may be a two-dimension code image generated by coding the first data with a two-dimension code coding rule by the first client terminal device. In this block, the second client terminal device may obtain the second data published by the first client terminal device by scanning the two-dimension code image in the float window on the first client terminal device with a two-dimension code tool.

In block S302, the second client terminal device may decode the second data and obtain the first data in the browser of the first client terminal device.

Since the second data is the two-dimension code image generated by coding the first data with the two-dimension code coding rule by the first client terminal device, in this block, the second client terminal device may decode the second data with the two-dimension coding rule and obtain the first data in the browser of the first client terminal device. The second client terminal device may decode the second data in the form of the two-dimension code image obtained via scanning the two-dimension code tool and obtain the first data in the browser of the first client terminal device.

In block S303, the second client terminal device may output the first data.

The second client terminal device may output the first data according to requirements of the user of the second client terminal device. For instance, if the first data is the URL, the second client terminal device may input the URL in an address bar of the browser and display the page corresponding to the URL in the browser. In the alternative, if the first data is text information, the second client terminal device may display the text information or output the text information after editing the text information (insert the text information in a file). In another alternative, if the first data is picture information, the second client terminal device may set the picture information as a desktop wallpaper and display the desktop wallpaper. In another alternative, if the first data is audio and video information, the second client terminal device may play the audio and video information. It should be noted that if the first data is the audio and video information, the first client terminal device may share the audio and video information and playback process information with the second client terminal device. When the second client terminal device outputs the audio and video information, the second client terminal device may continue to play the audio and video information or replay the audio and video information to effectively enhance the experiences of the user.

According to this example of the present disclosure, the first client terminal device may perform the graphic coding on the to-be-shared first data in the browser of the first client terminal device to generate the second data and publish the second data. The second client terminal device may perform graphic decoding on the second data published by the first client terminal device. That is, the first data may be shared between the first client terminal device and the second client terminal device. With the examples of the present disclosure, the first client terminal device and the second client terminal device need not to be connected by wires or connected wirelessly. Therefore, operations of the data sharing may not be limited by the connection mode, the operations of the data sharing may be simple and the efficiency of the data sharing may be enhanced.

The above flow for sharing the data may be described hereinafter with an example.

Assume that the first client terminal device is the PC and the second client terminal device is the mobile phone. If the user of the PC intends to share the URL of the current page in the browser of the PC to the mobile phone to utilize convenience of the mobile phone and view the current page on the PC anytime and anywhere, the flow of the data sharing provided by the examples of the present disclosure may be as follows.

Figure 4A:
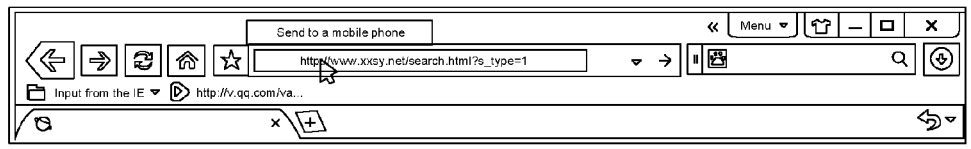
FIG. 4a is a schematic diagram illustrating an example of data sharing in accordance with an example of the present disclosure.

Referring to FIG. 4a, FIG. 4a is a schematic diagram illustrating an example of data sharing in accordance with an example of the present disclosure. As shown in FIG. 4a, when the user of the PC selects the URL of the current page in the address bar of the browser of the PC, after N seconds, the PC may output a button "send to the mobile phone". If the user clicks the button, the data sharing instruction may be sent out. N is a positive integer and N may be set as needed. Since the address bar of the browser is set to input the URL, the input operation of the user may be performed by selecting the address bar. In this example of the present disclosure, a setting may be made to make a response to the data sharing operation of the user after N seconds to distinguish the input operation of the user and effectively avoid a false operation. After the PC receives the data sharing instruction from the user, the PC may obtain the URL of the current page selected by the user from the address bar of the browser and take the URL as the to-be-shared first data.

Figure 4B:
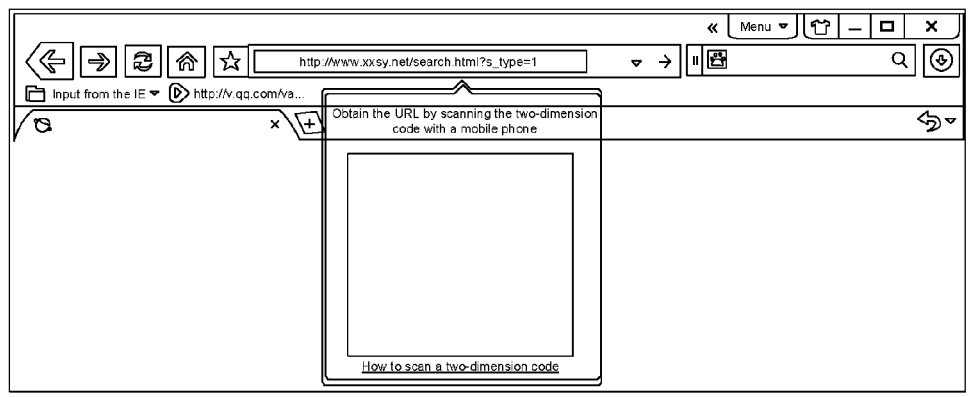
FIG. 4b is a schematic diagram illustrating another example of data sharing in accordance with an example of the present disclosure.

Referring to FIG. 4b, FIG. 4b is another schematic diagram illustrating another example of data sharing in accordance with an example of the present disclosure. The PC may code the URL of the to-be-shared first data with the two-dimension code coding rule to generate the second data. The second data may be the two-dimension code image. The PC may display the two-dimension code image with the float window shown in FIG. 4b.

Figure 4C:
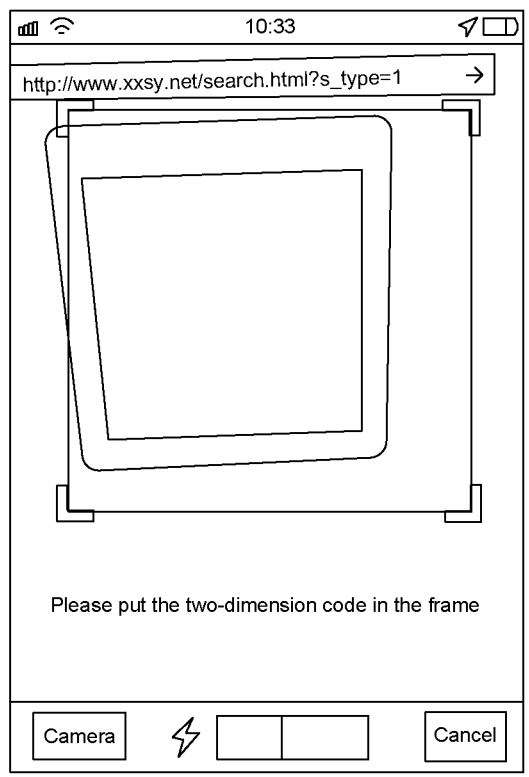
FIG. 4c is a schematic diagram illustrating another example of data sharing in accordance with an example of the present disclosure.

Referring to FIG. 4c, FIG. 4c is another schematic diagram illustrating another example of data sharing in accordance with an example of the present disclosure. The mobile phone may scan the two-dimension code image in the float window in the PC with the two-dimension code tool, decode the scanned two-dimension code image and obtain the URL in the two-dimension code image.

Figure 4D:
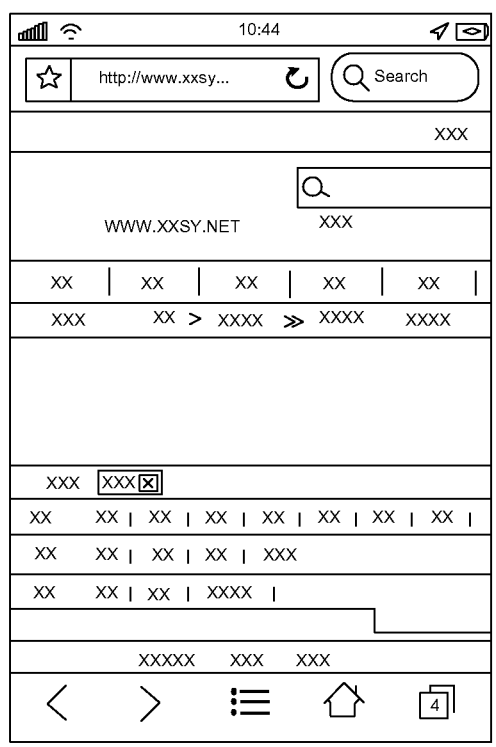
FIG. 4d is a schematic diagram illustrating another example of data sharing in according with an example of the present disclosure.

Referring to FIG. 4d, FIG. 4d is another schematic diagram illustrating another example of data sharing in accordance with an example of the present disclosure. The mobile phone may output the URL obtained by decoding according to the requirements of the user of the mobile phone. As shown in FIG. 4d, the mobile phone may input the URL in the browser and display the current page of the PC corresponding to the URL.

It should be noted that the example shown FIG. 4 may be described for illustration. The data sharing process of the first client terminal device, such as sharing the picture information, text information and audio and video information may be available from the examples shown in FIGS. 4a to 4d, which is not repeated here.

According to this example of the present disclosure, the first client terminal device may perform the graphic coding on the to-be-shared first data in the browser of the first client terminal device to generate the second data and publish the second data. The second client terminal device may perform graphic decoding on the second data published by the first client terminal device. That is, the first data may be shared between the first client terminal device and the second client terminal device. With the examples of the present disclosure, the first client terminal device and the second client terminal device need not to be connected by wires or connected wirelessly. Therefore, operations of the data sharing may not be limited by the connection mode, the operations of the data sharing may be simple and the efficiency of the data sharing may be enhanced.

Client terminal devices provided by examples of the present disclose may be described hereinafter accompanying with FIGS. 5 to 7. It should be noted that the client terminal device may be applied to the above methods.

Figure 5:
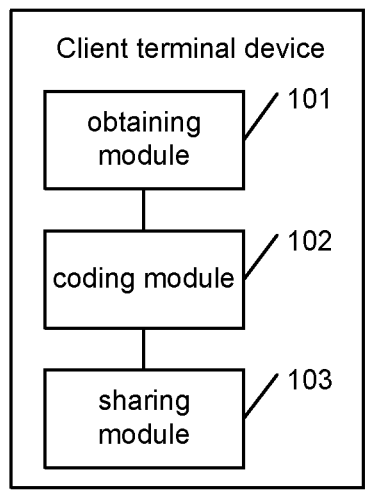
FIG. 5 is a schematic diagram illustrating structure of a client terminal device in accordance with an example of the present disclosure.

Referring to FIG. 5, FIG. 5 is a schematic diagram illustrating structure of a client terminal device in accordance with an example of the present disclosure. In this example, the client terminal device may be a first client terminal device. The client terminal device may include an obtaining module 101, a coding module 102 and a sharing module 103.

The obtaining module 101 may be to receive a data sharing instruction and obtain first data in a browser of the client terminal device.

When a user of the first client terminal device shares the first data in the browser of the first client terminal device with another client terminal device, the user may send the data sharing instruction to the first client terminal device and the obtaining module 101 may obtain the first data instructed by the data sharing instruction. For instance, if a user of a PC shares a Uniform Resource Locator (URL) of a current page in a browser of the PC with a mobile phone to utilize mobility and convenience of the mobile phone and view the current page on the PC anytime and anywhere, the user of the PC may send the data sharing instruction to the PC to instruct the PC to share the URL of the current page and the obtaining module 101 may obtain the URL of the current page from the browser.

The coding module 102 may be to perform graphic coding on the first data to generate second data.

The coding module 102 may perform the graphic coding on the first data to generate the second data and share the first data via publishing the second data. It may be avoided that the to-be-shared first data may be directly published and the security of the to-be-shared first data and the reliability of the data sharing may be ensured. The coding module 102 may code the first data with a two-dimension code coding rule to generate the second data. The second data may be a two-dimension code image.

The sharing module 103 may be to publish the second data, so that the second client terminal device may decode the second data and obtain the first data shared by the client terminal device. The sharing module 103 may be to display the second data in a float window, so that the second client terminal device may decode the second data and obtain the first data in the browser of the client terminal device.

Figure 6:
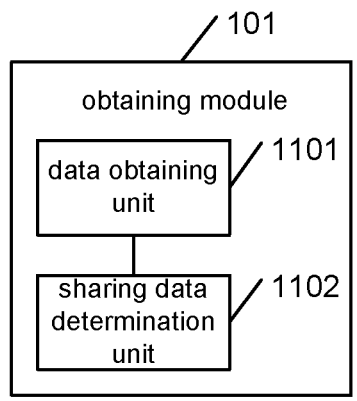
FIG. 6 is a schematic diagram illustrating structure of an obtaining module shown in FIG. 5.

Referring to FIG. 6, FIG. 6 is a schematic diagram illustrating structure of the obtaining module 101 as shown in FIG. 5. The obtaining module 101 may include a data obtaining unit 1101 and a sharing data determination unit 1102.

The data obtaining unit 1101 may be to receive the data sharing instruction for sharing data in a page in the browser of the client terminal device and obtain the data instructed by the data sharing instruction from the page.

The sharing data determination unit may be to take the data as the first data.

It should be noted that the structure and functions of the client terminal devices shown in FIGS. 5 and 6 are available from the methods in the method examples shown in FIGS. 1, 2 and 4. The implementation process may be available from relevant description in the above method examples, which may not be repeated here.

According to this example of the present disclosure, the first client terminal device may perform the graphic coding on the to-be-shared first data in the browser of the first client terminal device to generate the second data and publish the second data. The second client terminal device may perform graphic decoding on the second data published by the first client terminal device. That is, the first data may be shared between the first client terminal device and the second client terminal device. With the examples of the present disclosure, the first client terminal device and the second client terminal device need not to be connected by wires or connected wirelessly. Therefore, operations of the data sharing may not be limited by the connection mode, the operations of the data sharing may be simple and the efficiency of the data sharing may be enhanced.

Figure 7:
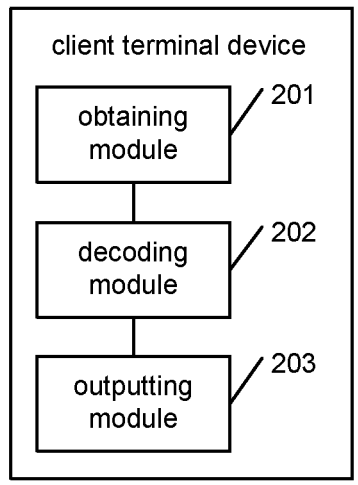
FIG. 7 is a schematic diagram illustrating structure of another client terminal device in accordance with an example of the present disclosure.

Referring to FIG. 7, FIG. 7 is a schematic diagram illustrating structure of another client terminal device in accordance with an example of the present disclosure. A client terminal device in this example may be a second client terminal device. The client terminal device may include an obtaining module 201, a decoding module 202 and an outputting module 203.

The obtaining module 201 may be to obtain second data published by a first client terminal device.

The first client terminal device may display the second data in an independent float window to publish the second data. The obtaining module 201 may obtain the second data published by the first client terminal device via reading content in the float window displayed on the first client terminal device. The second data may be a two-dimension code image generated by coding the first data with a two-dimension code coding rule by the first client terminal device. The obtaining module 201 may obtain the second data published by the first client terminal device by scanning the two-dimension code image in the float window on the first client terminal device with a two-dimension code tool.

The decoding module 202 may be to obtain first data in a browser of the first client terminal device by performing graphic decoding on the second data.

Since the second data is the two-dimension code image generated by coding the first data with the two-dimension code coding rule by the first client terminal device, the decoding module 202 may decode the second data with the two-dimension coding rule and obtain the first data in the browser of the first client terminal device. The decoding module 202 may decode the second data in the form of the two-dimension code image obtained via scanning with the two-dimension code tool and obtain the first data in the browser of the first client terminal device.

The outputting module may be output the first data.

The outputting module 203 may output the first data according to requirements of the user of the second client terminal device. For instance, if the first data is the URL, the outputting module 203 may input the URL in an address bar of the browser and display the page corresponding to the URL in the browser. In the alternative, if the first data is text information, the outputting module 203 may display the text information or output the text information after editing the text information (insert the text information in a file). In another alternative, if the first data is picture information, the outputting module 203 may set the picture information as a desktop wallpaper and display the desktop wallpaper. In another alternative, if the first data is audio and video information, the outputting module 203 may play the audio and video information. It should be noted that if the first data is the audio and video information, the first client terminal device may share the audio and video information and playback process information with the second client terminal device. When the outputting module 203 outputs the audio and video information, the outputting module 203 may continue to play the audio and video information or replay the audio and video information to effectively enhance the experiences of the user.

It should be noted that the structure and functions of the client terminal device shown in FIG. 7 may be available from the method examples shown in the above FIGS. 3 and 4. The specific implementation process may be available from the above method examples, which may not be repeated here.

According to this example of the present disclosure, the first client terminal device may perform the graphic coding on the to-be-shared first data in the browser of the first client terminal device to generate the second data and publish the second data. The second client terminal device may perform graphic decoding on the second data published by the first client terminal device. That is, the first data may be shared between the first client terminal device and the second client terminal device. With the examples of the present disclosure, the first client terminal device and the second client terminal device need not to be connected by wires or connected wirelessly. Therefore, operations of the data sharing may not be limited by the connection mode, the operations of the data sharing may be simple and the efficiency of the data sharing may be enhanced.

Another example of the present disclosure may further provide a data sharing system. The system may include at least two client terminal devices. The client terminal devices may be the client terminal devices in FIG. 5 to 6 or the client terminal device in FIG. 7. The structure of the client terminal devices in the data sharing system may be shown in FIGS. 5 to 7, which may not be repeated here.

According to this example of the present disclosure, the first client terminal device may perform the graphic coding on the to-be-shared first data in the browser of the first client terminal device to generate the second data and publish the second data. The second client terminal device may perform graphic decoding on the second data published by the first client terminal device. That is, the first data may be shared between the first client terminal device and the second client terminal device. With the examples of the present disclosure, the first client terminal device and the second client terminal device need not to be connected by wires or connected wirelessly. Therefore, operations of the data sharing may not be limited by the connection mode, the operations of the data sharing may be simple and the efficiency of the data sharing may be enhanced.

Figure 8:
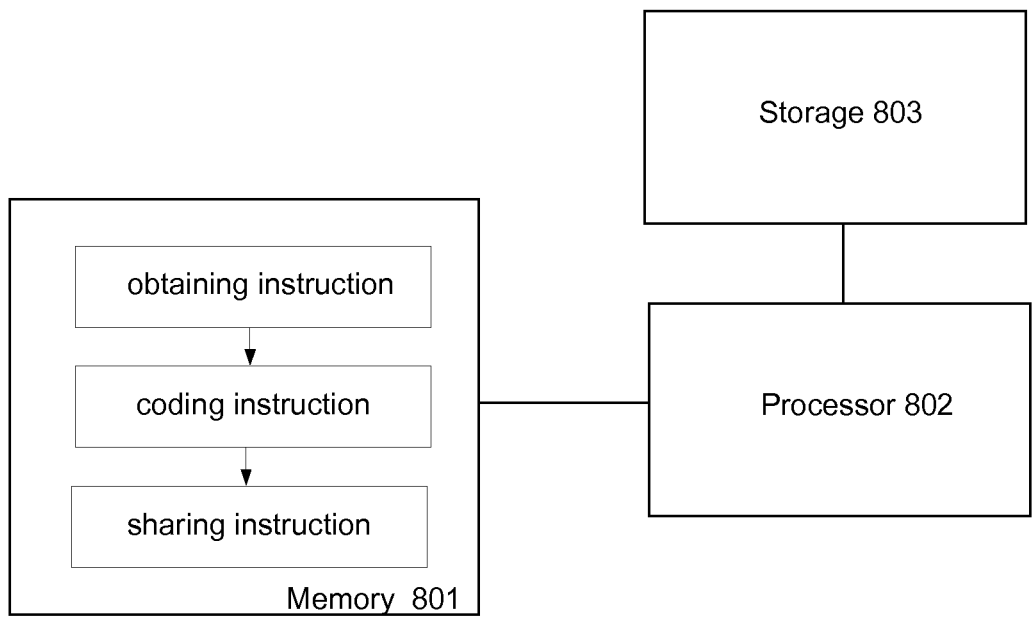
FIG. 8 is a schematic diagram illustrating structure of another client terminal device in accordance with an example.

Referring to FIG. 8, FIG. 8 is a schematic diagram illustrating structure of another client terminal device in accordance with an example of the present disclosure. The client terminal device may include a memory 801, a processor 802 and a storage 803.

The memory 801 may be to store an obtaining instruction, a coding instruction and a sharing instruction.

The storage 803 may be to store first data.

The processor 802 may communicate with the memory 801, execute the obtaining instruction, coding instruction and sharing instruction to respectively execute operations of the above obtaining module 101, coding module 102 and sharing module 103.

According to an example of the present disclosure, the obtaining instruction may include a data obtaining sub-instruction and a sharing data determination sub-instruction. The processor 802 may further communicate with the memory 801, execute the data obtaining sub-instruction and sharing data determination sub-instruction and respectively execute operations of the above data obtaining unit 1101 and sharing data determination unit 1102.

Figure 9:
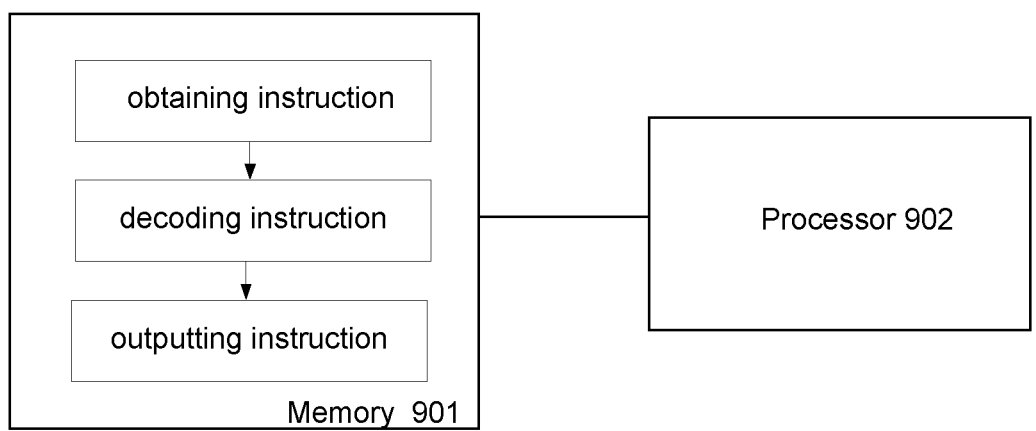
FIG. 9 is a schematic diagram illustrating structure of another client terminal device in accordance with an example of the present disclosure.

Referring to FIG. 9, FIG. 9 is a schematic diagram illustrating structure of another client terminal device in accordance with an example of the present disclosure. The client terminal device may include a memory 901 and a processor 902.

The memory 901 may be to store an obtaining instruction, a decoding instruction and an outputting instruction.

The processor 902 may be to communicate with the memory 901, execute the obtaining instruction, decoding instruction and outputting instruction to respectively execute operations of the above obtaining module 201, decoding module 202 and outputting module 203.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A data sharing method, comprising:
   in response to a selection operation of first data performed by a user of a first client terminal device, displaying a button indicating sharing selected data to a second client terminal device in a browser of the first client terminal device;
   obtaining, by the first client terminal device, the first data in the browser of the first client terminal device when receiving a clicking operation on the button indicating sharing selected data to the second client terminal device performed by the user of the first client terminal device;
   performing, by the first client terminal device, graphic coding on the first data to generate second data;
   displaying, by the first client terminal device, the second data in a float window, so that a second client terminal device scans and decodes the second data in the float window to obtain the first data;
   wherein the first client terminal device is a Personal Computer (PC) or a mobile device, and the second client terminal device is a PC or a mobile device;
   wherein the second client terminal device decodes the second data in the float window to obtain the first data includes:
   when the first data is a Uniform Resource Locator (URL), the second client terminal device running a browser on the second client terminal device, inputting the URL in the browser on the second client terminal device and displaying a page corresponding to the URL;
   when the first data is text data, the second client terminal device displaying the text data or displaying the text data after editing the text data;
   when the first data is picture data, the second client terminal device displaying the picture data or setting picture data as a desktop wallpaper;
   when the first data is audio data and video data, the second client terminal device playing the audio data and video data.

2. The method according to claim 1, wherein performing, by the first client terminal device, the graphic coding on the first data to generate the second data comprises:
   coding, by the first client terminal device, the first data with a two-dimension code coding rule to generating the second data;
   the second data is a two-dimension code image.

3. A data sharing method, comprising:
   obtaining, by a second client terminal device, second data, which is generated by a first client terminal device using first data in a browser of the first client terminal device and displayed in a float window of the first client terminal device, by scanning the second data, wherein the first data in the browser of the first client terminal device is obtained by the first client terminal device by:
   displaying a button indicating sharing selected data to the second client terminal device in the browser of the first client terminal device in response to a selection operation of the first data performed by a user of a first client terminal device, receiving a clicking operation on the button indicating sharing the selected data to the second client terminal device performed by the user of the first client terminal device;
   obtaining, by the second client terminal device, the first data in the browser of the first client terminal device by performing graphic decoding on the second data; and
   outputting, by the second client terminal device, the first data;
   wherein the first client terminal device is a Personal Computer (PC) or a mobile device, and the second client terminal device is a PC or a mobile device;
   wherein outputting, by the second client terminal device, the first data includes:
   when the first data is a Uniform Resource Locator (URL), the second client terminal device running a browser on the second client terminal device, inputting the URL in the browser on the second client terminal device and displaying a page corresponding to the URL;
   when the first data is text data, the second client terminal device displaying the text data or displaying the text data after editing the text data;

when the first data is picture data, the second client terminal device displaying the picture data or setting picture data as a desktop wallpaper;

when the first data is audio data and video data, the second client terminal device playing the audio data and video data.

4. The method according to claim 3, wherein obtaining, by the second client terminal device, the first data in the browser of the first client terminal device by performing the graphic decoding on the second data comprises:

obtaining, by the second client terminal device, the first data in the browser of the first client terminal device by decoding the second data with a two-dimension code coding rule;

the second data is a two-dimension code image generated by coding the first data with the two-dimension code coding rule by the first client terminal device.

5. A client terminal device, comprising: a processor and a non-transitory storage memory containing computer instructions executable by the processor to:

obtain first data in a browser of the client terminal device when receiving a data sharing instruction, wherein the data sharing instruction comprises: a clicking operation on a button indicating sharing selected data to a second client terminal device performed by a user of the client terminal device, and the button indicating sharing selected data to the second client terminal device is displayed in the browser of the client terminal device in response to a selection operation of the first data performed by the user of the client terminal device;

perform graphic coding on the first data to generate second data; and display the second data in a float window, so that a second client terminal device scans and decodes the second data in the float window;

wherein the client terminal device is a Personal Computer (PC) or a mobile device, and the second client terminal device is a PC or a mobile device;

wherein the second client terminal device decodes the second data in the float window includes:

when the first data is a Uniform Resource Locator (URL), the second client terminal device running a browser on the second client terminal device, inputting the URL in the browser on the second client terminal device and displaying a page corresponding to the URL;

when the first data is text data, the second client terminal device displaying the text data or displaying the text data after editing the text data;

when the first data is picture data, the second client terminal device displaying the picture data or setting picture data as a desktop wallpaper;

when the first data is audio data and video data, the second client terminal device playing the audio data and video data.

6. The client terminal device according to claim 5, wherein the computer instructions are further executed by the processor to perform the graphic code on first data with a two-dimension code coding rule to generate the second data;

the second data is a two-dimension code image.

7. A client terminal device, comprising: a processor and a non-transitory storage memory containing computer instructions executable by the processor to:

obtain second data, which is generated by a first client terminal device using first data in a browser of the first client terminal device and displayed in a float window of the first client terminal device, by scanning the second data, wherein the first data in the browser of the first client terminal device is obtained by the first client terminal device by: displaying a button indicating sharing selected data to the client terminal device in the browser of the first client terminal device in response to a selection operation of the first data performed by a user of a first client terminal device, obtaining the first data when receiving a data sharing instruction, wherein the data sharing instruction comprises: a clicking operation on the button indicating sharing selected data to the client terminal device performed by the user of the first client terminal device;

obtain first data in the browser of the first client terminal device by performing graphic decoding on the second data; and output the first data;

wherein the first client terminal device is a Personal Computer (PC) or a mobile device, and the client terminal device is a PC or a mobile device;

wherein the outputting instruction is further executed by the processor to:

when the first data is a Uniform Resource Locator (URL), run a browser on the client terminal device, input the URL in the browser on the client terminal device and display a page corresponding to the URL;

when the first data is text data, display the text data or display the text data after editing the text data;

when the first data is picture data, display the picture data or set picture data as a desktop wallpaper;

when the first data is audio data and video data, play the audio data and video data.

8. The client terminal device according to claim 7, wherein the computer instructions are further executed by the processor to obtain the first data in the browser of the first client terminal device by performing the graphic decoding on the second data with a two-dimension code coding rule;

the second data is a two-dimension code image generated by coding the first data with the two-dimension code coding rule by the first client terminal device.

* * * * *